(12) United States Patent
Kang et al.

(10) Patent No.: US 11,943,407 B2
(45) Date of Patent: Mar. 26, 2024

(54) USING PRE-SCAN TO IMPROVE SCAN SPEED BY DETECTING A DOCUMENT LOADED ON THE IMAGE READING APPARATUS

(71) Applicant: HEWLETT-PACKARD DEVELOPMENT COMPANY, L.P., Spring, TX (US)

(72) Inventors: Soo Young Kang, Pangyo (KR); Junghoon Kim, Pangyo (KR); Mi Jin Kang, Pangyo (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 53 days.

(21) Appl. No.: 17/600,383

(22) PCT Filed: Jun. 16, 2020

(86) PCT No.: PCT/US2020/037936
§ 371 (c)(1),
(2) Date: Sep. 30, 2021

(87) PCT Pub. No.: WO2021/066897
PCT Pub. Date: Apr. 8, 2021

(65) Prior Publication Data
US 2022/0182505 A1    Jun. 9, 2022

(30) Foreign Application Priority Data
Oct. 4, 2019 (KR) .................. 10-2019-0122983

(51) Int. Cl.
H04N 1/028 (2006.01)
H04N 1/00 (2006.01)
H04N 1/12 (2006.01)
H04N 1/21 (2006.01)

(52) U.S. Cl.
CPC ..... H04N 1/00782 (2013.01); H04N 1/00734 (2013.01); H04N 1/00758 (2013.01);
(Continued)

(58) Field of Classification Search
CPC .......... H04N 1/00681; H04N 1/00734; H04N 1/00758; H04N 1/00766; H04N 1/00782;
(Continued)

(56) References Cited

U.S. PATENT DOCUMENTS

| 4,819,035 A | 4/1989 | Arai et al. |
| 5,099,275 A | 3/1992 | Hicks |
| 5,264,948 A * | 11/1993 | Imoto ................. H04N 1/0464 358/487 |
| 6,621,944 B1 * | 9/2003 | Takahagi ............ H04N 1/6094 382/319 |

(Continued)

FOREIGN PATENT DOCUMENTS

| JP | 2-145085 | | 6/1990 |
| JP | 2000003111 A | * | 1/2000 |
| JP | 2002247303 A | * | 8/2002 |
| JP | 2006-217103 | | 8/2006 |
| JP | 2007266913 A | * | 10/2007 |
| JP | 2008-92341 | | 4/2008 |
| JP | 2011040913 A | * | 2/2011 |
| KR | 10-0219934 | | 6/1999 |

(Continued)

Primary Examiner — Chad Dickerson
(74) Attorney, Agent, or Firm — Brooks, Cameron & Huebsch, PLLC

(57) ABSTRACT

An image reading apparatus includes an image sensor to read a document, a sensor to detect whether the document is loaded on the image reading apparatus, and a processor to, when the sensor detects the document is loaded on the image reading apparatus, and before a scan instruction is input to the image reading apparatus, control the image sensor to execute a pre-scan job with respect to the loaded document using a default set value.

12 Claims, 7 Drawing Sheets

(52) U.S. Cl.
CPC ......... *H04N 1/00766* (2013.01); *H04N 1/028* (2013.01); *H04N 1/121* (2013.01); *H04N 1/2108* (2013.01); *H04N 2201/0094* (2013.01); *H04N 2201/0416* (2013.01); *H04N 2201/04703* (2013.01)

(58) Field of Classification Search
CPC .... H04N 1/00811; H04N 1/028; H04N 1/121; H04N 1/387; H04N 1/00915
USPC ........................ 358/1.5, 1.11–1.18, 400–404
See application file for complete search history.

(56) References Cited

U.S. PATENT DOCUMENTS

| | | | |
|---|---|---|---|
| 2004/0024844 A1* | 2/2004 | Holmstead | G06F 3/1265 709/219 |
| 2010/0046020 A1 | 2/2010 | Chung et al. | |

FOREIGN PATENT DOCUMENTS

KR    10-2006-0024184    3/2006

* cited by examiner

FIG. 5

| Option | Prescan Default value |
|---|---|
| File Resolution | 600 dpi |
| Color | Color |
| Scan Mode | Standard |
| Erase Edge | Off |
| Blank page | Off |

FIG. 6

| Option | Prescan Default value | User selected | Changed? |
|---|---|---|---|
| File Resolution | 600 dpi | 200 dpi | ○ |
| Color | Color | Black/Gray | ○ |
| Scan Mode | Standard | Book scan | ○ |
| Erase Edge | Off | Off | × |
| Blank page | Off | On | ○ |

USING PRE-SCAN TO IMPROVE SCAN SPEED BY DETECTING A DOCUMENT LOADED ON THE IMAGE READING APPARATUS

CROSS REFERENCE TO RELATED APPLICATIONS

This application is a U.S. National Stage Application which claims the benefit under 35 U.S.C. § 371 of International Patent Application No. PCT/US2020/037936 filed on Jun. 16, 2020, which claims priority from Korean Patent Application No. 10-2019-0122983 filed on Oct. 4, 2019, the contents of which are incorporated herein by reference.

BACKGROUND

An image reading apparatus is an apparatus which scans an original image of a document, a picture, or a film and converts the image into digital data. In this case, the digital data may be displayed on a monitor of a computer or printed by a printer and generated as a printed image. Examples of such an image reading apparatus include a scanner, a copier, a facsimile, and a multifunction peripheral (MFP) realizing functions of two or more of these apparatuses.

BRIEF DESCRIPTION OF THE DRAWINGS

FIG. 5 is a diagram showing a default option value applied during a pre-scan;

FIG. 6 is a diagram in which a default set value and a user set option value are compared to each other.

DETAILED DESCRIPTION

Hereinafter, various examples will be described with reference to the drawings. The examples described hereinafter may be modified and performed in various different ways.

In the disclosure, a case where a certain component is "connected" with another component includes a case where the components are 'directly connected with each other', as well as a case where the components are 'connected with each other with another component interposed therebetween'. In addition, a case where a certain component "includes" another component means that other components are not excluded and that other components may be further included, unless otherwise noted.

In this specification, an "image forming job" may mean various jobs (e.g. printing, scanning, or faxing) relating to images such as forming of an image or generating, saving, or transmitting of an image file, and the "job" may include the image forming job itself, processes for executing an image forming job, or a combination thereof.

In addition, an "image reading apparatus" may be an apparatus which reads an image of a document and generates a scan image. Examples of such an image reading apparatus may include a scanner, a copier, a facsimile, and a multi-function peripheral (MFP) realizing functions of two or more of these apparatuses. Meanwhile, in a case where the image reading apparatus is a copier, a facsimile, and a multi-function peripheral capable of executing an image forming job, the image reading apparatus may be referred to as an image forming apparatus.

In addition, "scan data" may mean a scan image generated by using the image reading apparatus, may be a monochrome image or a color image, and may have different types of file formats (for example, BMP, JPG, TIFF, PDF, and the like).

Figure 1:
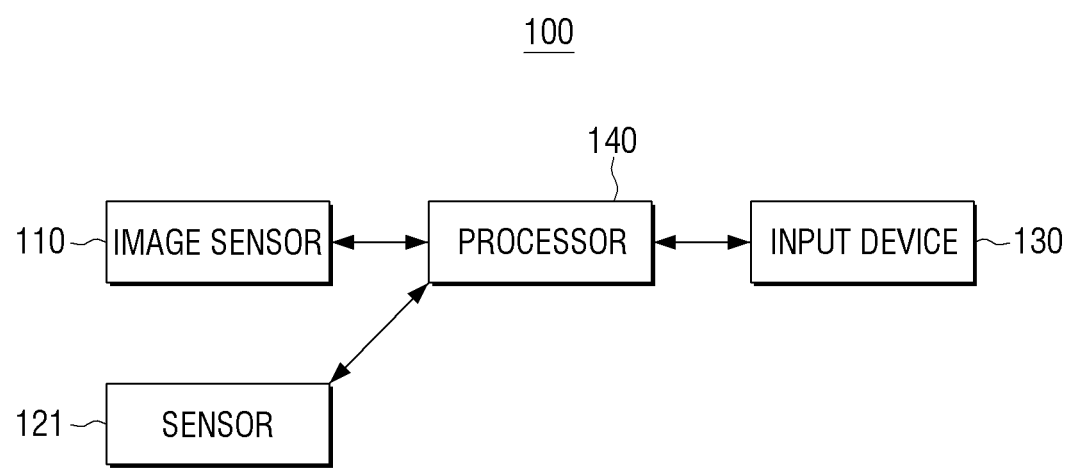
FIG. 1 is a block diagram schematically illustrating a configuration of an image forming apparatus according to an example.

FIG. 1 is a block diagram schematically illustrating a configuration of an image forming apparatus according to an example.

Referring to FIG. 1, an image reading apparatus 100 may include an image sensor 110, a sensor 121, an input device 130, and a processor 140.

The image sensor 110 may read a document. For example, the image sensor 110 may read image information of a document from light (or beam) reflected by a document. Such an image sensor 110 may include a charge coupled device (CCD) or a CMOS image sensor (CIS) disposed in a line in a main scanning direction. Such an image sensor 1110 may be disposed on a lower end of a flatbed and may be disposed in an automatic document feeder (ADF).

The sensor 121 may detect loading of a document. That is, the sensor 121 may detect whether the document is loaded on the image reading apparatus 100. For example, the sensor 121 may be a sensor which detects loading of a document on a flatbed, and may be a sensor which detects loading of a document on a paper feeding table of a paper feeder.

The input device 130 may receive a function selection and a control instruction regarding the function from a user. The function here may include a scanning function, a copying function, a fax transmission function, or combinations thereof. Such an input device 130 may be implemented as a user interface and include any of a plurality of buttons, a keyboard, a mouse, and the like, and may also be implemented as a touch screen capable of executing functions of a display which will be described at the same time.

The input device 130 may receive a setting of options regarding the functions described above, and may receive a function execution instruction using a set option (for example, a scan instruction). Meanwhile, in the implementation, the input device 130 may receive a function execution instruction, without selecting an option, and, in this case, a default option regarding the corresponding function may be used as an option for the function.

For example, the image reading apparatus 100 may support resolutions of 660 dpi, 400 dpi, 200 dpi, and 100 dpi. For example, a default resolution may be set as 200 dpi and when a user inputs a scan instruction without setting the resolution, a scan job may be executed with a resolution of 200 dpi which is the default resolution.

Meanwhile, hereinabove, a case where a scan option and a scan instruction are directly received from a user through the input device 130 has been described, but, in another example implementation, a scan option and a scan instruction may be input through an external device (for example, a user terminal device).

In addition, the input device 130 may receive login information. For example, the input device 130 may receive account information regarding a user (that is, login information).

The processor 140 may control each configuration in the image reading apparatus 100. For example, the processor 140 may be configured with an element such as a central processing unit (CPU) or an application specific integrated circuit (ASIC), and may be implemented with a plurality of processors (for example, a processor which executes overall control of an image reading apparatus and a graphics processing unit (GPU) which executes image processing).

The processor 140 may detect loading of a document. For example, the processor 140 may receive a signal indicating or pertaining to loading of a document from the sensor 121 and the processor may determine whether or not a document is loaded based on the signal.

When loading of a document is confirmed, the processor 140 may control the image sensor 110 to execute a pre-scan job with respect to the loaded document. The "pre-scan job" here is executing a scan job in advance with a default set value, before a scan instruction (or a function execution instruction including a scanning function such as a copy instruction or a fax transmission instruction) of a user. Thus, the processor may, when the sensor 121 detects the document is loaded on the image reading apparatus 100, and before a scan instruction is input to the image reading apparatus 100 (for example, via the input device 130), control the image sensor 110 to execute a pre-scan job with respect to the document. The pre-scan job may be executed with respect to the document using the default set value.

The "default set value" here is a combination of option values for generating a scan image of raw data which can be converted with various scan options of a user through various image processing. Such a default set value may be set differently for each user. An example of the default set value will be described later with reference to FIG. 5.

Meanwhile, hereinabove, the brief configuration configuring the image reading apparatus has been shown in FIG. 1 and described, but in the implementation, various configurations may be further included. This point will be described below with reference to FIG. 2.

Figure 2:
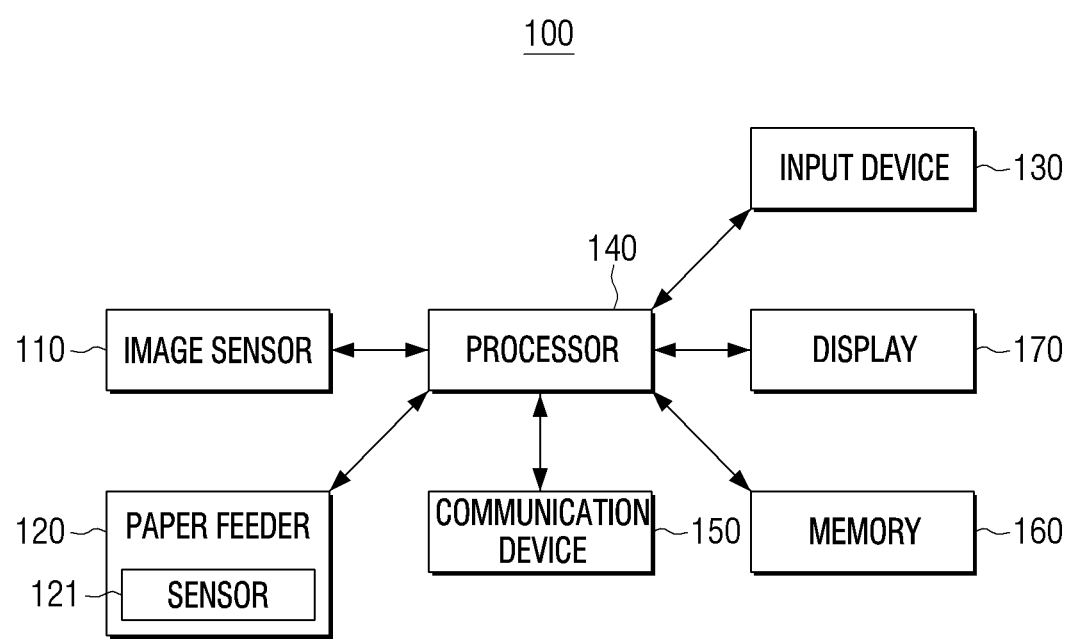
FIG. 2 is a block diagram schematically illustrating a configuration of an image forming apparatus according to an example.

FIG. 2 is a block diagram schematically illustrating a configuration of an image forming apparatus according to an example.

Referring to FIG. 2, the image reading apparatus 100 may include the image sensor 110, a paper feeder 120 including the sensor 121, the input device 130, the processor 140, a communication device 150, a memory 160, and a display 170.

The operations of the image sensor 110 and the sensor 121 have been described with reference to FIG. 1, and therefore, the repeated description thereof will be omitted. The processor 140 has also been also described with reference to FIG. 1, and therefore, the description regarding FIG. 1 will not be repeated, and configurations added to FIG. 2 and contents relating thereto will be described, hereinafter.

The paper feeder 120 may sequentially provide documents to the image sensor 110. For example, the paper feeder 120 may include a paper feeding table on which a recording medium, for example paper, may be loaded, the sensor 121 which detects loading of a document on the paper feeding table, a feeding roller which moves a document loaded on the paper feeding table to a paper transfer path one by one, and a plurality of rollers which move the document delivered through the paper transfer path to the image sensor.

The communication device 150 may be connected to a terminal device (not shown) such as a personal computer (PC), a notebook PC, personal digital assistants (PDA), a portable device (a smart phone or a tablet PC), a digital camera or the like, and transmit a scan image or a corrected scan image stored in the memory 160 to the terminal device.

For example, the communication device 150 may be formed to connect the image reading apparatus 100 to an external device in a wired and/or a wireless manner, and may be connected to a terminal device through a local area network (LAN) or the Internet network, and may also be connected through a Universal Serial Bus (USB) port or a wireless communication (for example, WiFi 802.11a/b/g/n, Near Field Communication), Bluetooth (NFC)) port. Such a communication device 150 may be referred to as a communication interface or a transceiver.

The memory 160 may store data for image processing. For example, the memory 160 may store a program for executing image processing of the processor 140 which will be described later, or store a signal read by the image sensor 110 or data processed by the processor 140 (for example, a pre-scan image, an image-processed scan image, or the like).

In addition, the memory 160 may store information regarding a default set value corresponding to the pre-scan job. Such a default set value may be selected by a manufacturer in advance, or may be set by a user (or administrator).

Such a memory 160 may be a volatile memory such as a Dynamic Random Access Memory (DRAM) or a Static Random Access Memory (SRAM), a non-volatile memory such as a Hard Disk Drive (HDD), a Solid Stage Drive (SSD), or a flash memory, or a combination of the volatile memory and the non-volatile memory.

The display 170 may display various information provided by the image reading apparatus 100. For example, the display 170 may display a user interface window for selection of various functions or options provided by the image reading apparatus 100. Such a display 170 may be a monitor such as a Liquid Crystal Display (LCD) or a Cathode Ray Tube (CRT), or may be implemented as a touch screen capable of executing functions of the input device 130 described above which will be described later at the same time.

In addition, the display 170 may display a control menu for function execution of the image reading apparatus 100. Through this, a user may input a scan instruction on the displayed user interface window. The scan instruction here may be an instruction for executing a scan job, or may be an instruction of scan-to-server, scan-to-Digital Living Network Alliance (DLNA), or scan-to-cloud for transmitting a scanned job to a server.

In addition, in a case where the image reading apparatus 100 is a multi-function peripheral (MFP) capable of executing a print job and a copy job, the scan instruction may be a copy instruction using a scanning function.

Meanwhile, in the example, a case where a scan instruction is input through the input device 130 has been described, but in another example implementation, a scan instruction may be received from a terminal device (not shown) through the communication device 150.

In addition, the display 170 may display the generated scan image and information regarding the scan image. The scan image displayed at this time may be a scan image as it is, or a preview image of the scan image.

Meanwhile, when loading of a document is confirmed, the processor 140 may immediately execute the pre-scan job or may execute the pre-scan job, after a certain period of time elapses, from the confirmation of the loading of a document. For example, a user may arrange a document and load the document on the paper feeder 120, but may also arrange a document, after loading the document on the paper feeder 120.

For example, in a case where a guide member which adjusts a width of a document is installed in the paper feeder 120, a user may execute an operation of adjusting a width of the guide member, after loading the document.

Accordingly, a certain period of time may be needed or taken by a user to execute such an adjustment operation, and after the certain period of time elapses, the pre-scan job may be executed. For example, the pre-scan job may be executed after 1 to 3 seconds. The predetermined period of time here is not limited to the range of period of time described above, and may be optimized through various experiments of a manufacturer, and an administrator may set a delay time.

Meanwhile, in a case where the image reading apparatus 100 includes an additional sensor which detects a movement of a width of the guide member described above or includes an infrared sensor capable of detecting a body of a user on an upper portion of the paper feeder 120, the processor 140 may execute the pre-scan job, if there is no movement of the guide member, after loading of paper is detected, or a body of a user is not detected on the upper portion of the paper feeder 120, after loading of a document.

When a scan image is generated in a pre-scan process, the processor 140 may store the generated scan image in the memory 160. Such a scan image may be a scan image of a document loaded on the flatbed, or a scan image of a document provided through an automatic document feeder.

Meanwhile, in a case where a scan instruction is not input within a predetermined period of time after the pre-scan job, or user login in the image reading apparatus 100 is failed by the predetermined number of times, the processor 140 may remove the scan image stored in the memory 160. For example, when the scan instruction is not input during the pre-scan process or after a predetermined period of time elapses from the completion of the pre-scan, the processor 140 may determine that a user has no intention of scanning with respect to the document and remove the scan image stored in the memory 160.

Meanwhile, when a user does not input the scan instruction after inputting a login operation with respect to the image reading apparatus 100, the processor 140 may store a scan image generated in the pre-scan process and information regarding the user in the memory 160. In a case where the scan instruction of the same user is input within a certain period of time, the processor 140 may execute the scan job by executing image processing and process the scan image stored in the memory 160 to obtain an option value set by a user.

Meanwhile, when the scan instruction is input by a user during the pre-scan job, the processor 140 may change a scan option of the scan job during the job. For example, the processor 140 may execute the scan job with respect to a remaining document, for which the pre-scan job has not been performed, with an option value corresponding to the scan instruction.

For example, the processor 140 may compare a default set value used during the pre-scan job and an option value corresponding to the scan instruction of a user to each other, and, when the option value is different therefrom, the processor 140 may control the image sensor 110 and the paper feeder 120 to execute the scan job with a changed option value.

For example, when a user selects a resolution of 200 dpi as a scan option and inputs a scan instruction, during a process of executing the pre-scan with 600 dpi in the image reading apparatus 100 supporting resolutions of 600 dpi, 400 dpi, and 200 dpi, the processor 140 may control the image sensor 110 and the paper feeder 120 to execute the scan job with respect to a remainder of the document with a resolution of 200 dpi.

At this time, the processor 140 may determine whether or not it is necessary to change a scan speed. For example, the processor 140 may execute the pre-scan job at a scan speed corresponding to the default set value during the pre-scan, and control the image sensor 110 and the paper feeder 120 to execute the scan job at a higher scan speed, when the scan speed corresponding to the scan option set by a user is higher than a previous scan speed.

For example, when the scan speed is 8 ppm, in a case where the image reading apparatus 100 executes the scan job with 600 dpi, and when the scan speed is 20 ppm, in a case where the image reading apparatus 100 executes the scan job with 200 dpi, the processor 140 may change the scan speed from 8 ppm to 20 ppm, in a case where a user inputs the scan instruction by setting the resolution as 200 dpi. A value of the speed here is merely an example and may vary depending on the performance of the image reading apparatus 100.

The processor 140 may execute image processing (an image processing operation), by applying an option value corresponding to a scan instruction with respect to the scan image generated by the pre-scan job. For example, the processor 140 may compare the default set value and the option value corresponding to the scan instruction of a user to each other, and execute image processing corresponding to the options having different values.

For example, in a case where a user inputs the scan instruction with a resolution of 200 dpi, the processor 140 may execute the image processing of converting a scan image which is scanned with 600 dpi into an image with 200 dpi, and in a case where a user inputs a monochrome scan instruction, the processor 140 may execute image processing of converting a color scan image into a monochrome scan image.

Meanwhile, hereinabove, a case where the image processing is executed with respect to the scan image generated in the pre-scan process has been described, but the processor 140 may also execute image processing corresponding to the scan option set by a user with respect to a scan image of a remaining part of the document.

Meanwhile, the processor 140 may execute the scan job with respect to the remaining document and the image processing with respect to the scan image generated by the pre-scan job in parallel or sequentially.

For example, in a case where the performance of the image reading apparatus 100 is suitable for processing two operations, for example simultaneously, the processor 140 may execute the scan job with respect to the remaining document and image processing with respect to a pre-scan result at the same time. For example, from a viewpoint that the performance of recent image processing apparatuses has improved, the entire scanning period of time can be significantly decreased by executing two jobs in parallel.

Hereinabove, the expression of executing processes in parallel has been used, but this may be expressed as that the scan job and the image processing are executed at the same time. For example, in a case where the processor 140 is implemented with a plurality of processors, each of the plurality of processors may execute an operation of controlling the image sensor and the paper feeder and an operation of executing the image process separately, at the same time. As another example, in a case where the processor 140 is implemented with one processor, this may be expressed as an operation of reading a signal of an image sensor and generating a scan image and an operation of image processing with respect to the generated scan image are alternately executed.

Meanwhile, in another example implementation, the scan job with respect to the remaining portion of the document and the image processing with respect to the pre-scan result may be sequentially executed. For example, when an option selected by a user needs image processing of a high resource, the scan job with respect to the remaining portion of the document may be first processed, and the image processing with respect to the image scanned during the pre-scan process may be executed thereafter.

In addition, in a case where a user requests a copy of a document, the processor 140 may first execute image processing with respect to a pre-scanned image (hereinafter, pre-scan image) to immediately execute a print job, and execute the scan job with respect to the remaining portion of the document, thereafter.

The processor 140 may merge the scan image generated by the scan job and the image-processed scan image. For example, the processor 140 may merge the image-processed pre-scan image and the scan image, to which a user option is applied, and generate one scan file. For example, the processor 140 may arrange the image-processed pre-scan image and the scan image generated by applying a user option to correspond to each other in an order of scanning, and generate one file.

In addition, FIG. 1 and FIG. 2 show and describe general functions of the image reading apparatus 100, but the image reading apparatus 100 may further include a fax transmission and reception unit which executes fax transmission and reception functions in accordance with a function supported by the image reading apparatus 100, in addition to the configurations described above.

For example, in a case where the image reading apparatus 100 supports a printing function, the processor 140 may execute a print job using a previously generated scan image. In another example, in a case where the image reading apparatus 100 supports fax transmission and reception functions, the processor 140 may convert a previously generated scan image into a fax format, and execute a job of transmitting the converted fax data.

As described above, the image reading apparatus according to the example executes the scan job first before the scan instruction of a user, and accordingly, the scan job may be executed at a higher speed.

Figure 3:
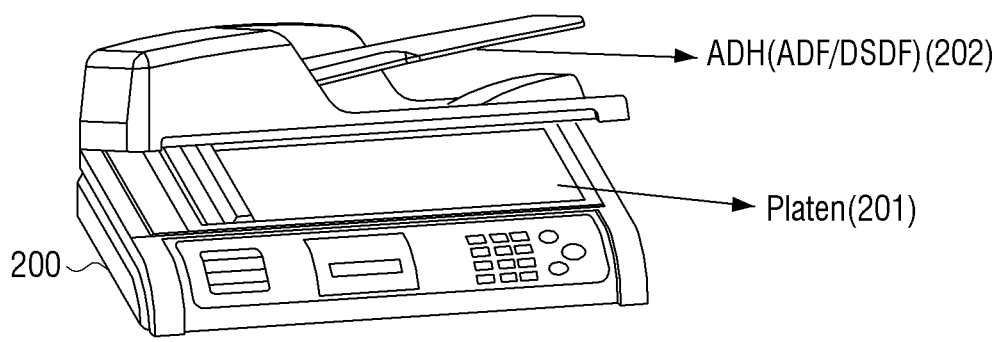
FIG. 3 is a diagram illustrating the image reading apparatus according to an example.

FIG. 3 is a diagram illustrating the image reading apparatus according to an example.

Referring to FIG. 3, the image reading apparatus 200 may include a flatbed type first scan device (platen) 201 which scans a document loaded on a flat plate, and an automatic document feeding type second scan device 202 of which may continuously scan documents loaded on an automatic feeding table.

The first scan device 201 is a flatbed type scan device and, when a document is loaded on a flat plate, a scan module including an image sensor may move on a lower portion of the flat plate, on which the document is loaded, and scan the document.

The second scan device 202 is an automatic document feeding type scan device, and when a document is loaded on a feeding table, the document may be sequentially move to a paper transfer path and an image sensor positioned above the paper transfer path may scan the document. Such a second scan device 202 may be a one-side scan device which may scan one side of a document or may be a double-side scan device which may scan both sides of a document.

The second scan device 202 here may be configured with the image sensor 110 and the paper feeder 120 described above with reference to FIG. 1 and FIG. 2.

That is, when a document is loaded on the scan device 202, the pre-scan job may be executed as described above.

Meanwhile, hereinabove, a case where the first scan device 201 and the second scan device 202 respectively include individual image sensors has been described, but in another example implantation, one image sensor may be commonly used in the first scan device 201 and the second scan device 202.

Meanwhile, hereinabove, a case where the pre-scan operation is executed in a case of using the second scan device 202 has been described, but in another example implementation, the pre-scan operation may be executed, in a case of using the first scan device 201.

For example, in a case where a user scans a plurality of pages of a book, a user may load one side of the book on the flatbed and input a scan instruction. At this time, the first scan device 201 may execute the pre-scan job when the user loads one side of the book on the flatbed, and when the scan instruction of a user is input, the first scan device 201 may execute image processing with respect to a scan image generated by the pre-scan job and execute a scan job by using a scan option selected in advance, in the scan job of the next page.

Figure 4:
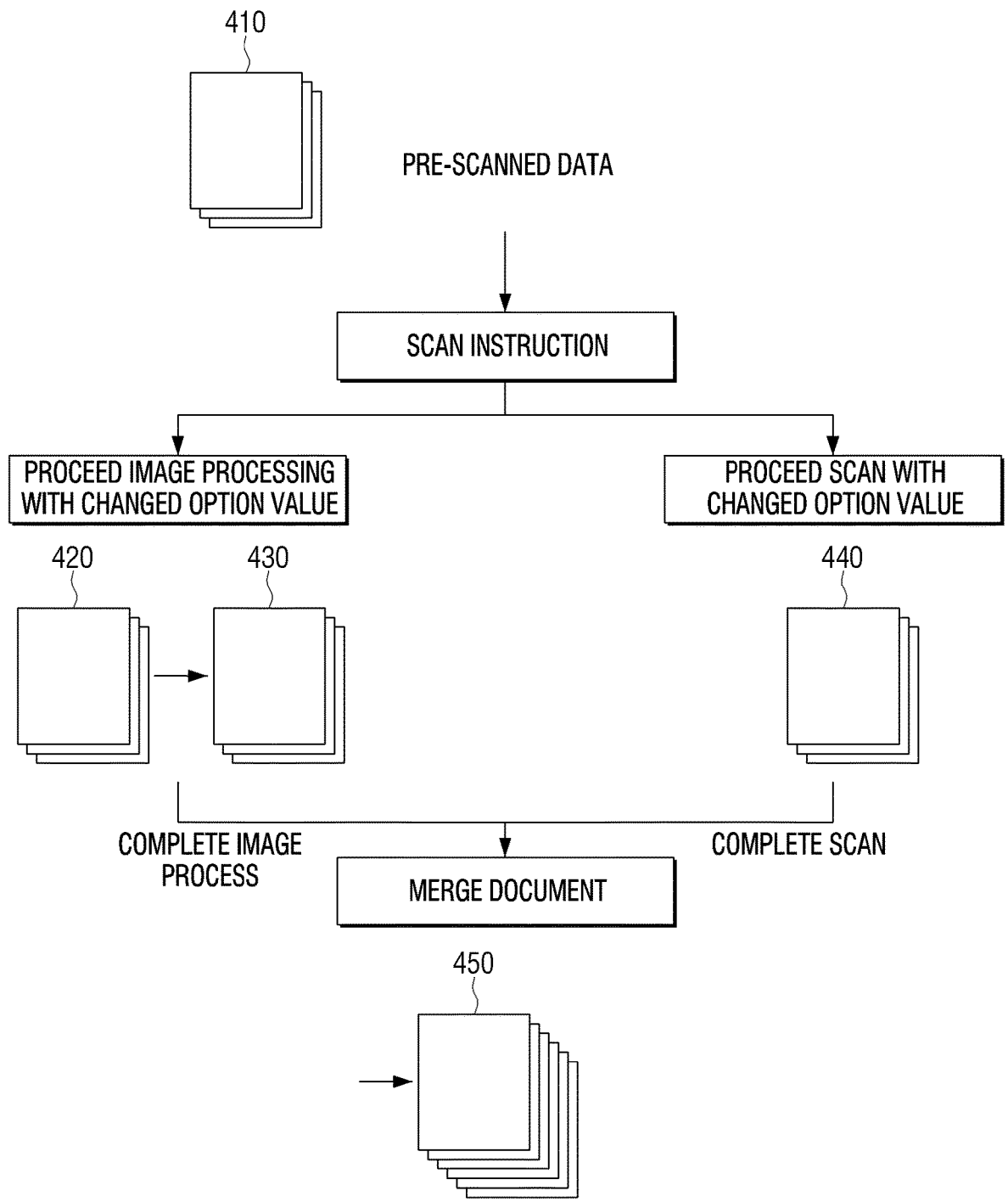
FIG. 4 is a diagram for illustrating a scan operation according to an example.

FIG. 4 is a diagram for illustrating a scan operation according to an example.

Referring to FIG. 4, when a user loads a document in an automatic paper feeder, the loading of the document may be confirmed by using a sensor.

When the loading of the document is confirmed, the pre-scan job may be executed to generate a pre-scan image 410 of the document.

When a scan instruction is input from a user during the pre-scan job, a scan job, to which a scan option corresponding to the scan instruction of a user is applied, may be executed with respect to a remaining portion of the document after the scan instruction, and generate a scan image 440 therefrom.

Meanwhile, when a scan instruction is input, image processing, to which a scan option set by a user is applied, is executed with respect to the pre-scan images 410 and 420 generated in parallel during the pre-scan job, and an image-processed scan image 430 may be output.

When the scan job with respect to all documents and the image processing are completed, the scan image 440 which is an output of the scan job and the pre-scan image 430 which is an output of the pre-scan job may be merged to generate a final scan image 450.

Meanwhile, hereinabove, an example in which the image processing with respect to the result of the pre-scan job and the scan job with respect to the remaining portion of the document are executed in parallel has been described, but as described above, the scan job may be executed after the image processing, or the image processing may be executed after the scan job.

FIG. 5 is a diagram showing a default option value applied during the pre-scan.

A scan option includes an option which directly affects a quality or characteristic of a scan image generated by a scan process using an image sensor and an option applied through image processing. For example, the option directly affecting the quality or characteristic of the scan image generated by the scan process may be a selection of a resolution, a selection of a color or monochrome scan, or the like.

That is, in a case of generating a color image through image processing, when the scan has been performed with a monochrome scan option, or in a case of increasing a resolution, when the scan has been performed with a low resolution, it is difficult to clearly display an original image.

Accordingly, regarding the option directly affecting the quality or characteristic of the scan image generated by the scan process, the pre-scan job may be executed using option values for maximum performance of options supported by the image reading apparatus 100.

For example, in the image reading apparatus 100 capable of performing a scan operation with a resolution of 600 dpi, 400 dpi, 200 dpi, and 100 dpi, an option value for maximum performance is 600 dpi, and the scan job may be executed with a resolution of 600 dpi during the pre-scan process. For example, in the image reading apparatus 100 capable of performing color scan and monochrome scan, the scan job may be executed with a color system during the pre-scan process.

Meanwhile, a default set value of the scan option capable of being applied through image processing may be set by not applying the scan option. For example, edge correction, zooming in and out, blank page removal, margin correction, color correction, brightness correction, and the like may be executed during image processing, and accordingly, the pre-scan job may be executed by setting such options not to be applied during the pre-scan process.

Meanwhile, such a default set value may be set differently depending on a user. Accordingly, in a case where a user A logs in the image reading apparatus, the pre-scan job may be executed with a default set value set by the user A.

Meanwhile, in a case where the login operation is executed after the pre-scan operation, that is, in a case where the pre-scan operation/login operation/scan instruction are performed in a stepwise manner, the processor 140 may execute the pre-scan operation with a default set value, and may proceed with the pre-scan operation with a default set value corresponding to the user, after a user login operation. When a scan instruction is input after that, the processor 140 may proceed with the scan operation with a scan option value corresponding to the scan instruction.

FIG. 6 is a diagram in which a default set value and a user set option value are compared to each other.

Referring to FIG. 6, regarding a plurality of scan options, an option value applied to a pre-scan option and an option value corresponding to a user instruction are shown.

In the example shown in the drawing, default set values and user set values are different regarding options of a resolution, a color, a scan mode, and blank page removal. Accordingly, based on this, the processor 140 may determine to execute resolution conversion image processing, image processing of converting a color mode to a monochrome mode, image processing of removing a blank page, and image processing of converting into a book form.

In a case where it is determined that such a plurality of image processing operations are performed, the order of priority of the plurality of image processing operations may be determined and the image processing operations may be executed according to the determined order of priority. For example, first, the image processing operation of removing a blank image from a plurality of scan images may be executed, the image processing operation of converting a resolution and the image processing operation of converting a color mode may be executed, and finally, the image processing operation of converting into a book form may be executed.

Figure 7:
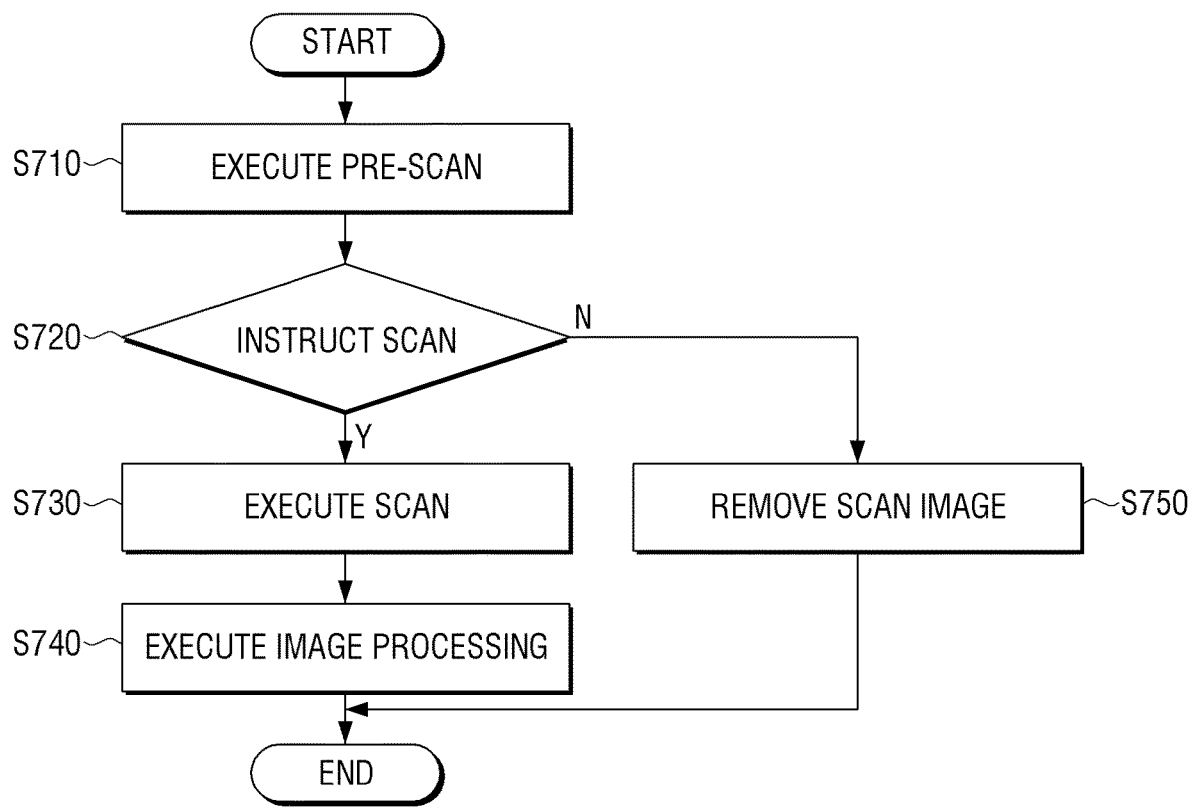
FIG. 7 is a flowchart illustrating an image reading method according to an example.

FIG. 7 is a flowchart illustrating an image reading method according to an example.

Referring to FIG. 7, when loading of a document is detected, a pre-scan job with respect to the loaded document is executed using a predetermined default set value (S710). For example, when loading of a document is detected, a pre-scan job may be executed at a scan speed corresponding to a default set value, after a predetermined period of time elapses.

A scan instruction is input during the pre-scan job (S720). Such a scan instruction may be directly input in the image reading apparatus 100 or may be input from a user terminal device.

When the scan instruction is input (S720-Y), a scan job is executed with an option value corresponding to the scan instruction (S730). For example, the scan job may be executed with respect to a remaining portion of the document, for which the pre-scan job has not been performed, at a scan speed corresponding to the input option value.

Image processing which applies the option value corresponding to the scan instruction is executed with respect to a scan image generated by the pre-scan job (S740). For example, a scan option in which the predetermined default set value and the option value corresponding to the scan instruction are different from each other, may be confirmed, and the image processing corresponding to the confirmed scan option having a different value may be executed with respect to the scan image generated by the pre-scan job.

In an example implementation, such image processing may be executed in parallel with the scan job described above or may be executed, after the scan job is completed.

When the scan job and the image processing are completed through the processes described above, the scan image generated by the scan job and the image-processed scan image may be merged. An operation of printing the merged scan image or transmitting the merged scan image to an external device may be additionally executed depending on a setting of a user.

Meanwhile, when a scan instruction is not input from a user, after the completion of the pre-scan job, the scan image generated during the pre-scan image may be removed (S750). For example, when a scan instruction is not input within a predetermined period of time after the pre-scan or within a predetermined period of time after the completion of the pre-scan, the scan image which is a result of the pre-scan may be removed.

As described above, in the image reading method according to the example, the scan job is started before a scan instruction of a user, and accordingly, the scan job may be more rapidly executed. For example, the scan job may be divided into a process of reading a document by physically using an image sensor and a process of performing image processing of the read document, and from a viewpoint that recent image reading apparatuses have a rapid image processing speed with respect to a document due to improvement of a performance of a processor. Thus, a document reading period of time using a physical image sensor may be reduced and a more rapid scan job may be performed.

Meanwhile, the image reading method described above may be implemented as a program and provided to an image forming apparatus. For example, a program including the image reading method may be stored and provided in a non-transitory computer readable medium.

Hereinabove, examples of the disclosure have been shown in the drawings and described, but the disclosure is not limited to the examples described above, and various modifications to the examples may be performed within a range not departing from the scope of the disclosure, or as claimed in the claims.

What is claimed is:

1. An image reading apparatus, comprising:
an image sensor to read a document;
a sensor to detect whether the document is loaded on the image reading apparatus; and
a processor to: control the image sensor to execute a pre-scan job with respect to the document using a default set value in response to detection of the document loaded on the image reading apparatus by the sensor prior to receiving a scan instruction input to the image reading apparatus; and
apply an option value in response to receiving a scan instruction during the pre-scan job to generate an image-processed scan image with respect to a remaining portion of the document not read by the image sensor in the pre-scan job, when the option value is different than the default set value of the pre-scan job, wherein the image-processed scan image is generated in parallel with the execution of an image processing operation of the scan image generated by the pre-scan job.

2. The image reading apparatus according to claim 1, further comprising:
a paper feeder to sequentially feed documents to be read by the image sensor.

3. The image reading apparatus according to claim 2, wherein the processor is to execute an image processing operation with respect to the scan image generated by the pre-scan job, after completion of a scan job with respect to the remaining portion of the document.

4. The image reading apparatus according to claim 2, wherein the processor is to merge a scan image generated according to a scan job executed with respect to the remaining portion of the document with the image-processed scan image.

5. The image reading apparatus according to claim 2, wherein, when the sensor detects the document is loaded on the image reading apparatus, the processor is to control the image sensor and the paper feeder to execute the pre-scan job after a predetermined period of time elapses.

6. The image reading apparatus according to claim 1, further comprising:
a flatbed on which the document is loadable,
wherein, when the sensor detects the document is loaded on the flatbed and the scan instruction is input during or after execution of the pre-scan job, the processor is to execute an image processing operation by applying an option value corresponding to the scan instruction with respect to a scan image generated by the pre-scan job.

7. The image reading apparatus according to claim 1, comprising:
a memory to store a scan image generated by the pre-scan job,
wherein, when the scan instruction is not input within a predetermined period of time after the sensor detects the document is loaded on the image reading apparatus, the processor is to remove the scan image stored in the memory.

8. The image reading apparatus according to claim 1, wherein
the processor is to, when the sensor detects the document is loaded on the image reading apparatus, and before the scan instruction is input to the image reading apparatus, control the image sensor to execute the pre-scan job with respect to the document using the default set value, and
the default set value includes option values supported by the image reading apparatus which achieve maximum performance with respect to the pre-scan job.

9. The image reading apparatus according to claim 2, wherein
the processor is to control the image sensor and the paper feeder to execute the pre-scan job at a scan speed corresponding to the default set value, and
when the scan instruction is input during execution of the pre-scan job, the processor is to control the image sensor and the paper feeder to execute a scan job at a scan speed corresponding to the scan instruction.

10. The image reading apparatus according to claim 2, wherein
the processor is to determine whether the default set value and the option value corresponding to the scan instruction are different from each other by comparing the default set value with the option value.

11. An image reading method for an image reading apparatus, comprising:
detecting whether a document is loaded on the image reading apparatus;
executing a pre-scan job with respect to the document using a default set value when the document is detected to be loaded on the image reading apparatus, and before a scan is input to the image reading apparatus; and
applying an option value in response to receiving a scan instruction during the pre-scan job to generate an image-processed scan image with respect to a remaining portion of the document not read by an image sensor in the pre-scan job, when the option value is different than the default set value of the pre-scan job, wherein the image-processed scan image is generated in parallel with the execution of an image processing operation of the scan image generated by the pre-scan job.

12. A non-transitory machine-readable storage medium encoded with instructions, that when executed, cause an image reading apparatus to:
detect whether a document is loaded on the image reading apparatus;
control an image sensor to execute a pre-scan job with respect to the document using a default set value when the document is detected to be loaded on the image reading apparatus, and before a scan instruction is input to the image reading apparatus; and
apply an option value in response to receiving a scan instruction during the pre-scan job to generate an image-processed scan image with respect to a remaining portion of the document not read by the image sensor in the pre-scan job, when the option value is different than the default set value of the pre-scan job, wherein the image-processed scan image is generated in parallel with the execution of an image processing operation of the scan image generated by the pre-scan job.

* * * * *